US009765560B2

(12) United States Patent
Hawkins et al.

(10) Patent No.: US 9,765,560 B2
(45) Date of Patent: Sep. 19, 2017

(54) APPARATUS AND METHOD FOR DRIVING A MOVEABLE CLOSURE

(71) Applicant: Automatic Technology (Australia) Pty Ltd, Keysborough, Victoria (AU)

(72) Inventors: Ray Hawkins, Frankston (AU); Geoffrey Baker, Geelong (AU)

(73) Assignee: Automatic Technology (Australia) Pty. Ltd., Victoria (AU)

( * ) Notice: Subject to any disclaimer, the term of this patent is extended or adjusted under 35 U.S.C. 154(b) by 219 days.

(21) Appl. No.: 14/433,510

(22) PCT Filed: Oct. 3, 2013

(86) PCT No.: PCT/AU2013/001134
§ 371 (c)(1),
(2) Date: Apr. 3, 2015

(87) PCT Pub. No.: WO2014/053018
PCT Pub. Date: Apr. 10, 2014

(65) Prior Publication Data
US 2015/0252607 A1    Sep. 10, 2015

(30) Foreign Application Priority Data
Oct. 3, 2012  (AU) ................................ 2012904316

(51) Int. Cl.
*G05B 15/02* (2006.01)
*E05F 15/665* (2015.01)
(Continued)

(52) U.S. Cl.
CPC .............. *E05F 15/665* (2015.01); *E06B 9/68* (2013.01); *G05B 15/02* (2013.01); *E05F 15/668* (2015.01);
(Continued)

(58) Field of Classification Search
CPC ...................................................... G05B 15/02
(Continued)

(56) References Cited

U.S. PATENT DOCUMENTS

| 4,794,731 A | 1/1989 | Willmott et al. |
| 5,137,500 A | 8/1992 | Lhotak |

(Continued)

FOREIGN PATENT DOCUMENTS

| AU | 2008264221 A1 | 7/2009 |
| GB | 2341948 A | 3/2000 |

(Continued)

OTHER PUBLICATIONS

PCT International Search Report, PCT Application No. PCT/AU2013/001134 (Nov. 8, 2013).

(Continued)

*Primary Examiner* — David S Luo
(74) *Attorney, Agent, or Firm* — Marsh Fischmann & Breyfogle, LLP

(57) ABSTRACT

The present invention relates to an apparatus and method for driving a moveable closure, such as a garage door. In an initialisation process in a setup mode for the door operator for driving a moveable closure between open and closed positions, the apparatus allows selection of opening and/or closing speeds for the closure from a plurality of predefined stored driving speeds. This selection, or the range of stored driving speeds available for selection, is made in accordance with the type of closure to be driven, and this may be established automatically by detecting certain characteristics of movement of the closure as part of the initialisation process.

20 Claims, 2 Drawing Sheets

(51) Int. Cl.
*E06B 9/68* (2006.01)
*E05F 15/668* (2015.01)

(52) U.S. Cl.
CPC ..... *E05Y 2400/36* (2013.01); *E05Y 2400/456* (2013.01); *E05Y 2800/00* (2013.01); *E05Y 2800/176* (2013.01); *E05Y 2900/106* (2013.01)

(58) Field of Classification Search
USPC .............................................. 318/3, 34, 558
See application file for complete search history.

(56) References Cited

U.S. PATENT DOCUMENTS

| | | | |
|---|---|---|---|
| 6,657,409 B1 | 12/2003 | Leivenzon et al. | |
| 7,212,897 B2 * | 5/2007 | Suzuki .................... | E05F 15/70 318/282 |
| 7,615,945 B2 * | 11/2009 | Richmond ............ | E05F 15/611 318/264 |
| 8,109,352 B2 * | 2/2012 | Asbach .................... | B62K 9/00 180/65.1 |

FOREIGN PATENT DOCUMENTS

| | | |
|---|---|---|
| GB | 2381085 B | 7/2003 |
| WO | 9213300 A1 | 8/1992 |

OTHER PUBLICATIONS

Written Opinion of the International Searching Authority, PCT Application No. PCT/AU2013/001134 (Nov. 8, 2013).
Response to Written Opinion, PCT Application No. PCT/AU2013/001134 (Aug. 8, 2014).

\* cited by examiner

APPARATUS AND METHOD FOR DRIVING A MOVEABLE CLOSURE

FIELD OF THE INVENTION

The invention relates to an apparatus and method for driving a moveable closure. In a preferred form, the invention relates to operation of a garage door.

BACKGROUND OF THE INVENTION

Any discussion of documents, acts, materials, devices, articles and the like in this specification is included solely for the purpose of providing a context for the present invention. It is not suggested or represented that any of these matters formed part of the prior art base or were common general knowledge in the field relevant to the present invention as it existed in Australia or elsewhere before the priority date of each claim of this application.

It is common for different closures to be driveable by a common type of operator unit, so that a dedicated operator unit is not required for each different type and size of closure. For example, overhead garage doors fall into a number of different types, including sectional doors, overhead curtain doors, and one-piece tilt-up doors (jamb 'J-type' or track 'T-type', depending on the mechanism). Each different door employs a different guiding mechanism for raising and lowering, and thus exhibits a different movement profile. To couple a common operator unit to different door types can cause problems with regard to safe and effective operation under all conditions.

Safe and effective operation generally involves the following considerations:
  (a) the travel speed of the bottom edge of the door is slow enough to ensure that the operator unit has sufficient time to detect the door striking an obstruction, so that the unit may take appropriate action (stopping or reversing) before damage or injury can occur;
  (b) the travel speed is fast enough to complete open and close movements within a reasonable time;
  (c) the travel speed is slow enough to ensure that the operator unit's coupling to the door, and the door's coupling to its guides and fixings, are able to interact without binding, bouncing or undue stress, which might otherwise prematurely wear mechanical components or interfere with the operator unit's ability to quickly and reliably detect the door meeting an obstruction.

As discussed above, for economic and inventory reasons it is desirable to provide an operator unit which can be used with as many different types and sizes of garage doors as possible, and preferably without requiring complex customisation prior to installation. The operator unit drive speed therefore needs to be capable of adjustment by the technician performing the installation. Such adjustment has conventionally been achieved either mechanically or electronically.

Mechanical speed adjustment often involves changing the size of the drive sprocket or gearing so that the resulting travel speed is modified, and examples of such solutions are described in U.S. Pat. Nos. 4,794,731 and 5,137,500. This type of solution requires partial disassembly of the operator unit, which can involve significant work and time on the part of the installer. Due to the physical limitation on the size of the sprockets available, and the economic limitations restricting the number of sprockets provided as part of the operator unit kit, this approach is generally inconvenient and provides only a limited range of possible speed adjustment. Another mechanical speed adjustment is proposed in Australian Patent Application No. AU2008264221. This concept uses a 'piggy-back' arrangement of a selected number of interengaged reduction gearbox units, to adapt the drive from a motor to suit different closures. Again, such an arrangement is generally inconvenient, particularly when limited space is available.

Another disadvantage of this form of speed adjustment is that the adjustment applies to both open and close directions of travel, with independent adjustment not being possible. It is often desirable to have a relatively slow closing speed, so that the operator unit's controller is able to detect obstructions before damage can occur (the slower the door is closing, the more time is available to prevent damage), and a faster opening speed, so that the opening travel can complete in a relatively short time. Furthermore, changing the drive sprocket alters the operator unit's load capability, travel limit settings and obstruction detection sensitivity, and the prior art provides no ready way to make allowance for these changes.

Electronic speed adjustment on the other hand does not generally require disassembly of the operator unit. Previously, electronic speed adjustment has been possible by special in-situ programming of the operator unit controller. This involves the use of hand held programming consoles which are connected to the operator unit and are used to modify the aspect of the programming of the controller which determines motor speed, for example, selecting the drive voltage to be applied to the motor. This method requires the installation technician to switch between programmer and operator unit consoles, or to switch between limit setup mode and speed adjustment mode, and this can be a significant inconvenience at installation, and particularly a safety concern when access to the operator requires the use of a ladder.

The result of such conventional approaches is that installation times are extended, speed setting are not adjusted to optimum values, or speed setting is omitted altogether due to complexity or due to the time required.

SUMMARY OF THE INVENTION

According to a first aspect of the present invention, there is provided an apparatus for driving a moveable closure between open and closed positions, the apparatus configured to allow selection of opening and/or closing speeds for the closure from a plurality of predefined driving speeds stored by the apparatus.

Preferably, the apparatus comprises an electronic controller comprised in or connected to a closure operator unit and configured to manage driving of the closure between said open and closed positions in an operating mode.

The controller may be configured such that the opening and/or closing speeds may be selected as part of an initialisation process in a setup mode, in which the opening and closing limits of the closure are determined, without requiring switching into the operating mode or into a separate speed adjustment mode.

The closure driving speeds may be stored in the controller in the form of predefined driving speed profiles. Each speed profile may be a single speed, but preferably comprises a closing driving speed and an opening driving speed, and the two speeds may be different. Further, the speed may vary over the course of travel of the closure. Any number of driving speed profiles may be defined and stored in the controller and made available for selection.

In one form of the invention, the available predefined driving speed profiles are programmed in the controller during production and cannot thereafter be modified.

Preferably, the apparatus includes a means for establishing, in said setup mode, the type of closure to be driven.

This means for establishing may be an operator input to the controller, allowing the operator to assess the closure type and/or size, and make a selection (eg. from a lookup table) of a suitable speed.

Alternatively, the apparatus may be configured to sense one or more characteristics relating to the movement of the closure. Such characteristics may include distance travelled by the closure, speed of the closure, and resistance of the closure. In this way, the apparatus can make an automatic determination of the type of door.

The predefined driving speed profiles may be specifically configured for different types of closures. In this way, the nature of the closure may inform the appropriate opening and closing driving speed to be selected by the controller.

The apparatus is preferably configured so that the driving speed profiles available for selection are restricted to a particular range from the plurality of the stored predefined driving speed profiles, the particular range determined in accordance with the closure type established.

Thus, specific criteria relating to closure type can be programmed into the controller. In setup mode the closure type is established, which in turn leads to the selection of a suitable driving speed profile, or allows selection of a driving speed profile from a range of driving speed profiles suitable for that closure type.

The apparatus may be configured to select a particular driving speed profile as a default setting. Preferably, this is the slowest of the available speed profiles selectable for the closure type established. An alternative selection of a faster speed profile may then be made from the available speed profiles, if desired.

In one embodiment, the apparatus may be configured to sense in setup mode the range of movement of the closure or a part of the closure, such as the top edge of the closure, when the closure is moved between open and closed position, in order to establish the closure type.

Selection of opening and or closing speed may also set one or more other operating parameters for said moveable closure, such as a threshold setting for an entrapment detection system.

The apparatus is preferably configured to perform the initialisation process in setup mode on first use of the apparatus.

Selection of opening and or closing speed preferably involves selection of electric power parameters, such as voltage and/or current, to be applied to an electric motor of said apparatus.

According to a second aspect of the present invention, there is provided a method for facilitating selection of driving speeds for a moveable closure operator unit when opening and closing a closure element, the method comprising, as part of a setup process performed to initialise operation of the operator unit, driving the closure toward one of an open or closed position, and allowing selection of opening and/or closing driving speeds from a plurality of predefined stored driving speeds.

The method may include the step of driving the closure toward the open and/or closed position so as to set a desired open/close limit position as part of the same setup process, before switching the operator unit into an operational mode.

The method may include the step of establishing a closure type, the closure type determining, from said plurality of predefined driving speeds, the driving speeds suitable for that closure type. The step of establishing may comprise receiving an input from an operator performing the setup process.

The method may include the step of driving the closure toward the open condition so as to automatically establish the type of closure.

The method may include a testing step whereby the driving speeds of the driving speed selected can be tested to check whether the opening and closing driving speeds are appropriate, and a different driving speed selected if required.

The method may include the step of, once the speed has been selected, performing a standard closure profiling procedure as part of the setup process.

According to a further aspect of the present invention, there is provided a moveable closure operator unit having an electronic controller programmed to perform the method of the second aspect of the invention.

The closure may be a garage door, and the different closure types may be selected from the group of sectional doors, overhead curtain doors, J-type tilt-up doors and T-type tilt-up doors.

DESCRIPTION OF THE DRAWINGS

The invention will now be further explained, by way of example only, and illustrated by reference to the accompanying drawings in which.

DETAILED DESCRIPTION

Conventional movable closure operator units of the type to which the present invention relates are arranged to drive a closure (such as a garage door) between prescribed open and closed positions by way of a powered motor drive. Operation of the operator unit is governed by an electronic controller which is configured to manage operation of the unit by providing the necessary instructions to the motor for driving the door.

Generally, electronic controllers comprise electrical circuitry and related components to receive input commands (from a user) and instruct the motor accordingly. Such controllers typically comprise a programmable micro-controller which stores the necessary instructions for carrying out the required operational management of the operator unit. The skilled reader will readily appreciate the nature and general composition of such controllers and related programming techniques and so further detailed discussion of these is omitted.

As discussed above, it is common for different types and/or sizes of garage doors (eg. sectional doors, overhead curtain doors, 'J-type' tilt-up doors and 'T-type' tilt-up doors) to be drivable by a common operator unit model. As such, each door installation often needs to have the operator unit's drive speed adjusted and set to ensure proper, safe, and reliable operation. Conventional means for achieving this often result in extended installation times and/or speed settings which are not adjusted to optimum values for given door types (and/or sizes).

Figure 1:
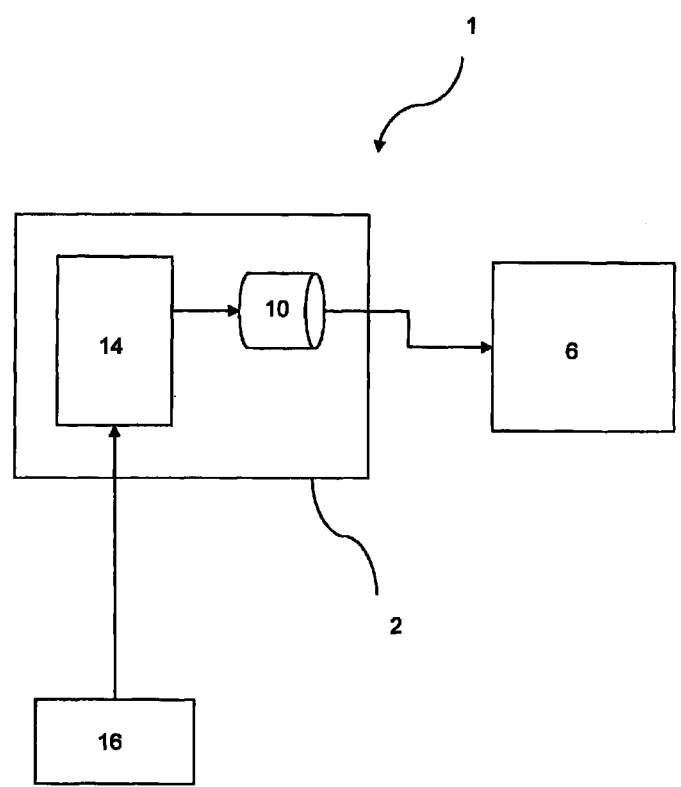
FIG. 1 is a schematic representation of a moveable closure operator unit having a controller arranged in accordance with one aspect of the present invention.

FIG. 1 diagrammatically illustrates the basic components for a moveable garage door system 1 which employs the principles of the present invention. The system 1 comprises an operator unit 2 which is arranged for driving a garage door 6 by way of a motor drive 10. Operator unit 2 comprises an electronic controller 14 which is configured to initialise and manage normal operation of motor drive 10. When operator unit 2 is first operated (following installation of the system 1), controller 14 is arranged to select suitable door 6 opening and closing speeds from a plurality of predefined driving speeds stored by the controller and based on the type of door being driven by the operator unit. In this way, controller 14 serves to provide a simple yet effective means for setting the appropriate opening and closing driving speeds of operator unit 2 for subsequent operation.

It will be appreciated that the door travel speed is determined by the electric power (voltage and/or current) supplied to motor drive 10, and the selection of door opening and closing speeds is therefore made by selecting from a plurality of suitable prescribed electric operating parameters.

During the normal course of operation, opening and closing of door 6 is instructed by a user of operator unit 2. The user interacts with operator unit 2 by way of an interface 16 which is arranged in communication with controller 14. Interface 16 may comprise any device which allows input signals (such as instructions to move the door up or down) to be relayed to controller 14. Examples of interface 16 include remote control devices (stationary or mobile) which are arranged in wireless communication with controller 14, or wall mounted devices which can be arranged in wired or wireless connection with the controller. Interface 16 may be provided as part of the operator unit 2 itself.

The door driving speeds are stored by controller 14 in the form of predefined driving speed profiles. Each driving speed profile comprises two predefined driving speeds: a driving speed for closing the door, and a driving speed for opening the door. The opening and closing speeds may be the same or they may be different, in which case the closing speed will preferably be set low than the opening speed. The skilled reader will appreciate that any number of driving speed profiles may be defined and stored by controller 14 so that they are available for selection for use with a range of specific door types available on the market. However, preferably the number of settings is relatively small, as providing fine tuning of speed selection is generally not necessary, and can over-complicate the operator initialisation process.

The speed profiles may vary over the opening and/or closing travel cycle. For example, they may include features such as soft start and/or soft stop (relatively slow speed at the beginning and/or end of travel), or other desired characteristics.

In one embodiment, controller 14 is programmed with four specific driving speed profiles as follows (the speeds being defined as a percentage of the full operating capacity of the motor 10):

| | | |
|---|---|---|
| (i) | 'VERY SLOW' | (Close = 50% Open = 50%) |
| (ii) | 'SLOW' | (Close = 65% Open = 65%) |
| (iii) | 'MED' | (Close = 70% Open = 80%) |
| (iv) | 'FAST' | (Close = 80% Open = 100%) |

All the driving speed profiles are programmed in the controller 14 during production of the operator unit 2. The controller 14 is programmed to allow for a predefined range of speed profiles to be selectable for use with a given door type, and each profile from the appropriate range can then be chosen by the installer if the installer decides on testing that the default speed profile selected is not optimal. The speed profiles themselves and the respective individual opening and closing speeds cannot be changed in the operator unit 2.

As discussed above, the skilled reader will understand that the speed (or speed profile) setting selected by controller 14 does not necessarily signify the absolute travel speed of door 6. Rather, the speed (or speed profile) corresponds with the power supplied to motor drive 10, by way of variation of one or more electrical parameters (eg. voltage, frequency, or current) of the motor power supply. Further, the speed will be affected by non-constant mechanical loads encountered during travel, due to physical characteristics of the door arrangement such as door weight or travel resistance due to components of the door arrangement itself, including resistance encountered during travel of the door in its guides or on its fixings. Accordingly, although in accordance with the present invention a specific speed profile is selected for the controller, the actual absolute speed of door 6 when driven by the motor drive 10 may vary depending these factors. However, as is known from the prior art, the door operator may include feedback-controlled speed regulation to maintain a constant speed (or a desired speed profile) by monitoring the absolute speed of travel of the door (eg. by way of a motor shaft encoder), and varying the power supplied to motor drive 10 in accordance therewith.

Many different types and sizes of garage doors exist, and so it is convenient to ensure that operator units are capable of driving a range of different door types in an appropriate manner. Thus, the driving speed profiles stored by controller 14 are specifically configured for different door types available so that operator unit 2 is capable of driving a given door type in a manner acceptable to the door manufacturer's own standards, accepted industry practice, and in-situ preference of the installer. Manufacturers may specify which speed regimes are suitable for their own closure products, including preferred (default) speeds. The set of speed profiles available, and the range of speed profiles allowed for each given door type (or size), as stored by controller 14, cannot be modified once programmed into the controller. As discussed below, the nature of the door informs the opening and closing driving speed profile which can be set in controller 14 to ensure the door is driven in a suitable manner.

In one embodiment of the invention, controller 14 is configured to identify, based on the movement of door 6, what type of door arrangement the operator unit 2 is driving, or at least to identify a type characteristic of the door. It is common for domestic operator units to drive closures referred to as 'J-type' doors (in which a tilt door panel pivots on a jamb-mounted mechanism, such that in the up position it protrudes externally of the door opening). With such an arrangement, the bottom edge of the door typically moves significantly more quickly than its top edge (the top edge being driven by way of a shuttle connected via belt or chain to the operator unit) due to the mechanical arrangement of this type of door. Whilst the top edge of the door moves only about 1 m, the bottom edge of the door travels substantially the full opening height. In this embodiment, controller 14 is therefore programmed to sense whether the top edge of the closure has exceeded—in full travel between limits—a certain distance (eg. about 1.2 m). If the top edge of the door exceeds this threshold, the controller 14 can thus automatically establish that a J-type door arrangement is not present and is programmed to then select a default driving speed profile, and allow selection of alternative speed profiles (ie. a range of permitted adjustment) appropriate for a non J-type arrangement. The skilled person will appreciate that other characteristics may be used to discriminate between door types such as, non-exhaustively, the travel speed of the door, applied torque resistance provided by the closure, and/or variations in any of these measures (ie. so that the dynamic nature of the door type May be considered for identification/discrimination purposes).

Controller 14 is configured to perform an initialisation process following installation of system 1 so as to configure the operator unit 2 for normal operational use with door 6. The method performed by controller 14 allows for the selection of opening and/or closing driving speeds from the predefined driving speed profiles stored in controller 14.

Figure 2:
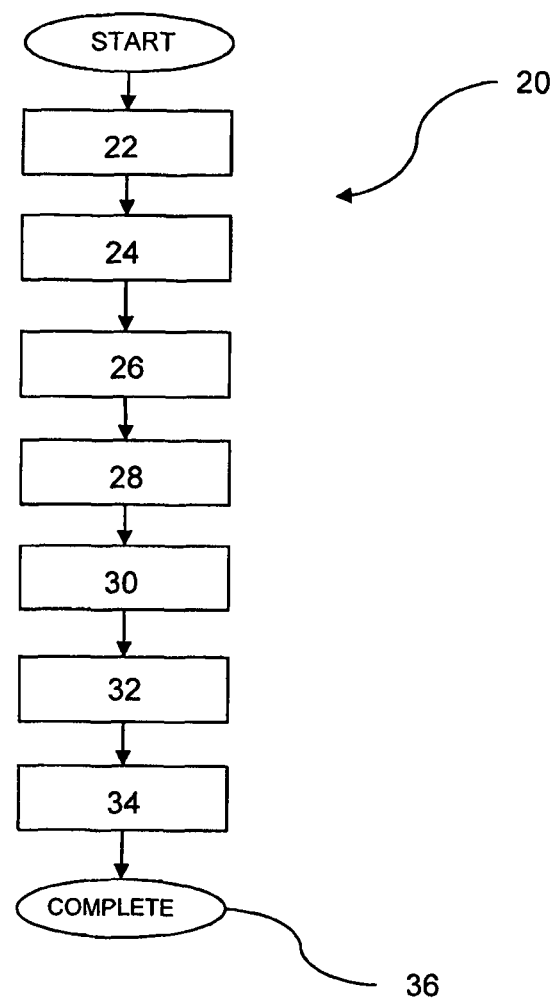
FIG. 2 is a flow chart showing the steps carried out for one implementation of a method used to initialise operation of a moveable closure operator unit.

FIG. 2 outlines the steps executed as part of the initialisation procedure 20 when system 1 is first installed (usually by an appropriate installation technician).

Initialisation procedure 20 is as follows:
(i) Drive door 6 to the desired close limit position (22).
(ii) Set and confirm desired close limit position (24).
(iii) Drive door 6 toward open position to establish door type and select an appropriate drive speed profile (26).
(iv) Test door driving speed in open and/or close directions. Reselect driving speed profile if desired within predefined limits permitted by the controller 14 for the identified door type (28).
(v) Drive door 6 to desired open limit position (30).
(vi) Set desired open limit and confirm the driving speed profile selected previously (32).
(vii) Execute automatic profiling procedure(s) (34).
(viii) Setup complete—operator unit 2 is ready for normal operational use (36).

Initially, controller 14 is configured to operate the door 6 in accordance with a driving speed profile which is considered suitable for all types of doors, ie. a default speed. For example, for safety reasons, the 'SLOW' driving speed profile is selected as the common default setting when commencing the initialisation procedure 20.

The initialisation procedure 20 commences with operator unit 2 driving the door 6 toward the closed position so as to reach the desired closed limit (22). This limit is confirmed in the controller 14 in step (24).

The door is then driven toward the open position (26). This movement provides an opportunity for the controller 14 to identify the specific type of door being driven by the operator unit 2. Here, the controller 14 senses the travel of the top edge of the door 6 to determine whether a certain travel distance (about 1.2 m) is exceeded (as explained further above). If the top edge of the door 6 does not exceed this threshold, the controller 14 confirms that a J-type door arrangement is present.

The skilled reader will appreciate that additional steps may need to be introduced as appropriate if the door discrimination method desired to be implemented is only operable when the door is driven in accordance with a closed movement cycle.

The installer can alternatively or additionally input to the controller an indication of the type of door, for situations where this cannot be automatically determined.

Once the type of door 6 has been identified or otherwise established and stored, controller 14 selects the preferred driving speed profile (default profile) from the predefined profiles available in the controller for that door type. Further, it will be appreciated that the controller 14 can be configured to apply a suitable speed profile appropriate to doors of the same type but which are of different sizes. Accordingly, the installer is thereby provided with discretion for varying the driving speed of the closure within the prescribed range as is deemed suitable (eg. a larger door may be driven more quickly so as to be closed or opened in the same time as a smaller door of the same type, or may be driven more slowly if safety is a key priority).

If operator unit 2 has been previously installed and used with the identified door type, and is subject to re-initialisation (eg. following maintenance or servicing), controller 14 can reselect the previously used non-default driving speed settings once the same door type has been identified and confirmed so as to relieve the installer from the need of having to re-select the non-default setting.

Step (28) allows the selected opening and closing driving speeds to be tested. For this stage, controller 14 is configured to allow the driving speed profile initially selected by the controller to be changed in favour of another suitable driving speed profile if the user decides that the driving speed selected by the controller 14 at step (26) is not to their preference. For example, if a J-type door arrangement is identified, controller 14, by default, selects the 'SLOW' driving speed profile. The user then has an opportunity to change from this speed profile setting once the opening and/or closing speeds of the door 6 have been tested. The controller 14 may allow the 'VERY SLOW' driving speed profile to be selected manually if the 'SLOW' driving speed profile were considered by the user to be inappropriate. Thus, only a very limited adjustment range is programmed for J-type doors, controller 14 only allowing the 'VERY SLOW' or 'SLOW' settings to be used with such a door. In this way, the restriction of the range of alternate selection allowed by controller 14 avoids the risk of unsuitable speed settings being manually selected by the installer.

If a non J-type door is identified, the controller is programmed to allow a different, wider adjustment range of speed profiles. For example, the controller may be programmed to select as a default mode the 'MEDIUM' setting, but limit the range of allowable speed profiles selectable by the user between 'SLOW', 'MEDIUM' and 'FAST'.

It will be appreciated that it is not possible for the installer to manually alter the driving speeds in the profiles themselves, but only to change between different speed profiles allowed by controller 14 for a given door type. Generally, then, the driving speeds themselves, and the number of speed driving profiles stored by controller 14, cannot be changed from the factory settings. However, in certain situations, it may be possible to allow for adjustment of the speed profiles. For example, it may be desirable for suppliers to be able to modify the speed settings programmed into operator controllers before supplying operators to installers, in order to customise operators for a particular new type of door, for example.

The installer can manually change from the default speed profile setting by way of interface 16. A faster or slower driving speed profile can be manually selected by the pressing of one or more buttons provided on the interface 16. For instance, if one driving speed profile has already been selected by controller 14, then the next fastest speed profile is selected on the next button press, the selection cycling back to the slowest speed profile once the highest speed profile has been reached. The new speed profile setting can be indicated to the user by a series of audio sounds or flashes of a LED indicator on interface 16. The skilled reader will readily appreciate other ways that such setting changes can be brought about using interface 16 or any other suitable interfacing device.

The initialisation process continues at step (30), in which the door 6 is driven toward the open position to set and confirm the open limit position. In this step, the driving speed profile selected during step (26/28) is confirmed once the open limit position is set. Controller 14 then executes a standard profiling procedure (34), following which operator unit 2 is ready for normal operational use (36).

It will be appreciated that limit setting and profiling procedures are well known in the art. With regard to profiling procedure (34), garage door operators include internal entrapment protection systems designed to monitor door speed and/or applied force (eg. current) as the door travels. If the door encounters an obstacle, the speed of the door slows, and if this slowing passes a set threshold value this activates the entrapment protection system to stop or reverse the movement of the door. It is also known, eg. from U.S. Pat. No. 6,657,409, that such an entrapment protection system can involve threshold profiling over the door open-close cycle. In this way, the set threshold varies in accordance with a prescribed or learned profile over the course of door travel.

In addition to the setting of the speed profile(s) for a door, controller 14 may be programmed to automatically select one or more further parameters for door operation. For example, it may be configured to select a particular threshold value or a threshold profile appropriate to the particular door type encountered.

The initialisation method 20 therefore provides a door driving speed selection procedure which can be undertaken as part of any standard limit setting or profiling procedure known in the art without exiting therefrom or interfering therewith. Accordingly, the disadvantages arising from, conventional approaches to driving speed selection and adjustment for moveable closure systems can be avoided.

It is to be understood that, throughout the description and claims of the specification, the word 'comprise' and variations of the word, such as 'comprising' and 'comprises', is not intended to exclude other additives, components, integers or steps.

Modifications and improvements to the invention will be readily apparent to those skilled in the art. Such modifications and improvements are intended to be within the scope of this invention.

The invention claimed is:

1. An apparatus for driving a moveable closure between open and closed positions, the apparatus configured to allow selection of opening and/or closing speeds for the closure from a plurality of predefined driving speeds stored by the apparatus.

2. The apparatus of claim 1, further comprising an electronic controller comprised in or connected to a closure operator unit and configured to manage driving of the closure between said open and closed positions in an operating mode.

3. The apparatus of claim 2, wherein the controller is configured such that the opening and/or closing speeds may be selected as part of an initialization process in a setup mode in which the opening and closing limits of the closure are established, without requiring switching into said operating mode or into a separate speed adjustment mode.

4. The apparatus of claim 2, wherein the closure driving speeds are stored in the controller in the form of predefined driving speed profiles, each profile preferably comprising a closing driving speed and an opening driving speed.

5. The apparatus of claim 4, wherein one or more of said predefined driving speed profiles includes a varying speed over the course of travel of the closure.

6. The apparatus of claim 4, wherein the available predefined driving speed profiles are programmed in the controller during production and cannot thereafter be modified.

7. The apparatus of claim 1, further comprising means for establishing the type of closure to be driven.

8. The apparatus of claim 7, in which said means for establishing includes a means configured to sense one or more characteristics relating to the movement of the closure.

9. The apparatus of claim 7, configured so that the driving speed profiles available for selection are restricted to a particular range from the plurality of the stored predefined driving speed profiles, the particular range determined in accordance with the closure type established.

10. The apparatus of claim 7, configured to select a particular driving speed profile as a default setting.

11. The apparatus of claim 7, configured to sense the range of movement of the closure or a part of the closure, such as the top edge of the closure, when the closure is moved between open and closed positions, in order to establish the closure type.

12. The apparatus of claim 1, wherein selection of opening and/or closing speed also selects one or more other operating parameters for said moveable closure.

13. A method for facilitating selection of driving speeds for a moveable closure operator unit when opening and closing a closure element, the method comprising, as part of a setup process performed to initialize operation of the operator unit, driving the closure toward one of an open and a closed position, and allowing selection of opening and/or closing driving speeds from a plurality of predefined stored driving speeds.

14. The method of claim 13, further comprising the step of driving the closure toward the open and/or closed position so as to set a desired open/close limit position as part of a setup process, before switching the operator unit into an operational mode.

15. The method of claim 13, further comprising the step of establishing a closure type, the closure type determining, from said plurality of predefined stored driving speeds, one or more driving speeds suitable for that closure type.

16. The method of claim 13, further comprising the step of driving the closure toward the open or closed position so as to automatically establish the type of closure.

17. The method of claim 13, further comprising the selection of other moveable closure operating parameters in accordance with the selected opening and/or closing driving speeds.

18. A moveable closure operator unit having an electronic controller programmed to perform the method of claim 13.

19. An apparatus for driving a moveable closure between open and closed positions, the apparatus configured to allow selection of opening and/or closing speeds for the closure from a plurality of predefined driving speeds stored by the apparatus based at least in part on a characteristic relating to the movement of the closure.

20. The apparatus of claim 19, wherein the selection comprises an input to the controller by an operator.

* * * * *